(12) United States Patent
Poole

(10) Patent No.: US 6,598,860 B2
(45) Date of Patent: Jul. 29, 2003

(54) RIBBED FISHTAPE

(75) Inventor: William K. Poole, Lake Wylie, SC (US)

(73) Assignee: Maclean Jameson, L.L.C., Clover, SC (US)

( * ) Notice: Subject to any disclaimer, the term of this patent is extended or adjusted under 35 U.S.C. 154(b) by 0 days.

(21) Appl. No.: 09/892,601

(22) Filed: Jun. 27, 2001

(65) Prior Publication Data

US 2003/0001146 A1 Jan. 2, 2003

(51) Int. Cl.[7] ............................................... B63B 35/03
(52) U.S. Cl. ..................... 259/139.3 FT; 254/134.3 R
(58) Field of Search .......................... 254/134.3 FT, 254/134.3 R; 428/600, 371, 369, 370; 15/104.33

(56) References Cited

U.S. PATENT DOCUMENTS

| | | | | |
|---|---|---|---|---|
| 2,559,160 A | * | 7/1951 | Jacob ........................ 175/376 |
| 3,858,848 A | * | 1/1975 | MacFetrich .......... 254/134.3 R |
| 3,979,106 A | * | 9/1976 | Jacques .............. 254/134.3 FT |
| 4,926,518 A | * | 5/1990 | Mikol ..................... 15/104.33 |
| 5,052,660 A | * | 10/1991 | Bergman ............ 254/134.3 FT |
| 5,176,775 A | * | 1/1993 | Montsinger .................. 156/181 |
| 5,505,432 A | * | 4/1996 | Noonan .............. 254/134.3 FT |
| D376,081 S | * | 12/1996 | Klamm .......................... D8/14 |
| 5,725,954 A | * | 3/1998 | Montsinger ................. 428/397 |
| 5,915,770 A | * | 6/1999 | Bergstrom ................. 294/19.1 |
| 5,938,180 A | * | 8/1999 | Walsten ..................... 254/134.3 |
| 6,146,759 A | * | 11/2000 | Land ........................... 428/370 |
| 6,319,618 B1 | * | 11/2001 | Kelley ........................ 428/600 |

* cited by examiner

Primary Examiner—Joseph J. Hail, III
Assistant Examiner—Daniel Shanley
(74) Attorney, Agent, or Firm—Adams Evans P.A.

(57) ABSTRACT

A fishtape is adapted for being fed through an internal passageway of a structure. The fishtape includes an elongated, flexible rod with a plurality of circumferentially-spaced, longitudinal ribs. The ribs are adapted to promote the fishability of the fishtape through the internal passageway of the structure.

17 Claims, 3 Drawing Sheets

RIBBED FISHTAPE

TECHNICAL FIELD AND BACKGROUND OF THE INVENTION

This invention relates to an elongated, nonconductive flexible rod commonly used by electricians and telephone or communications installers and technicians, and referred to in the art as "fishtape". Fishtape is typically used to facilitate installation of wire and cable through conduit or other passageway in walls, ceilings, and floors of buildings. Standard fishtapes are made of 0.080" to 0.500" diameter fiberglass or extruded plastic, and are supplied in reels containing 50 or more feet of tape.

Because most electrical wire and cable is relatively thin and flexible, pushing it through long lengths of conduit is virtually impossible. To facilitate running wire and cable using fishtape, a length of fishtape is first fed through the conduit from one open end to the other. The wire or cable is then attached to a leading end of the fishtape, and the fishtape pulled back through the conduit with the attached wire or cable trailing behind. During this process, substantial friction resistance is often encountered between the surfaces of the fishtape, wires or cables, and the walls of the conduit or passageway through which the wires or cables are being pulled. Overcoming this resistance generally requires considerable pulling force. To be effective, a fishtape must be stiff enough to be pushed through conduit, flexible enough to negotiate bends or turns in the conduit, and strong enough to pull multiple wires or cables back through the conduit, overcoming the friction resistance without breaking or separating from the wires or cables being pulled.

SUMMARY OF THE INVENTION

Therefore, it is an object of the invention to provide a fishtape which provides enhanced fishability through conduit and other passageways in walls and floors of buildings.

It is another object of the invention to provide a fishtape which is sufficiently flexible to negotiate bends and turns in a conduit or passageway.

It is another object of the invention to provide a fishtape which has relatively high tensile strength.

It is another object of the invention to provide a fishtape which resists kinking.

It is another object of the invention to provide a fishtape which can be easily gripped.

It is another object of the invention to provide a fishtape which yields less friction resistance when pushed or pulled through a conduit or passageway.

It is another object of the invention to provide a fishtape which can be used to obtain an approximation of the location of an obstruction in a conduit or passageway.

These and other objects of the present invention are achieved in the preferred embodiments disclosed below by providing a fishtape adapted for being fed through an internal passageway of a structure, such as a commercial or residential building. The fishtape includes an elongated, flexible rod with a plurality of circumferentially-spaced, longitudinal ribs. The ribs are adapted to promote the fishability of the fishtape through the internal passageway of the structure.

According to another preferred embodiment of the invention, the flexible rod has a fiberglass or extruded plastic core.

According to another preferred embodiment of the invention, the diameter of the fiberglass or extruded plastic core is less than one-half the diameter of the flexible rod.

According to another preferred embodiment of the invention, the flexible rod has an exterior sheath.

According to another preferred embodiment of the invention, the exterior sheath is formed of nylon.

According to another preferred embodiment of the invention, each of the longitudinal ribs has a point and first and second grooves formed on opposite sides of the point.

According to another preferred embodiment of the invention, the distance between a top of the point and a bottom of either groove is approximately 0.01 inches.

According to another preferred embodiment of the invention, a top of the point and a bottom of each groove define substantially equal radii.

According to another preferred embodiment of the invention, a top of the point of each rib defines a radius of approximately 0.005 inches.

According to another preferred embodiment of the invention, a bottom of each groove defines a radius of approximately 0.005 inches.

According to another preferred embodiment of the invention, the angular distance between grooves of each rib measured from a center of the fiberglass rod is between 15 and 20 degrees.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
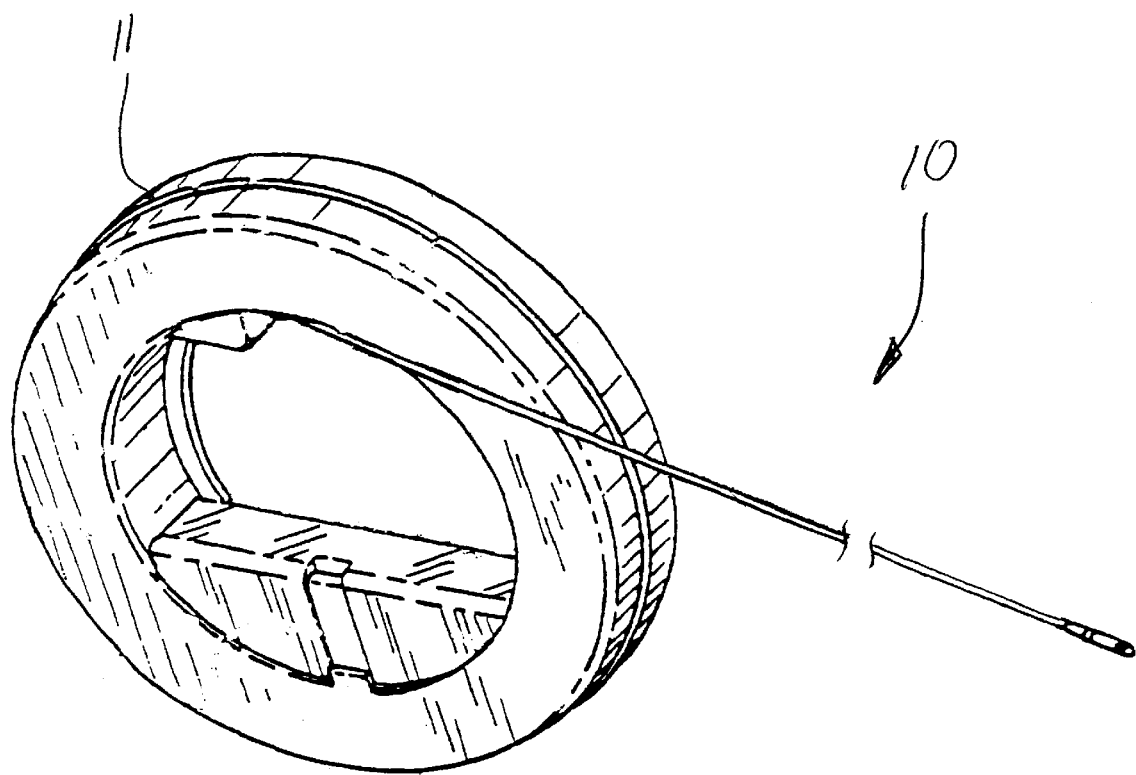
FIG. 1 is a perspective view of a fishtape reel carrying a fishtape according to one preferred embodiment of the invention.

Referring now specifically to the drawings, a fishtape according to the present invention is illustrated in FIG. 1 and shown generally at reference numeral 10. Fishtape 10 is commonly supplied in a reel, such as reel 11, containing 50 or more feet of tape. Examples of fishtape reels are provided in applicant's prior issued patents, U.S. Pat. Nos. 5,106,056 and 5,340,084. The complete disclosure of these patents is incorporated herein by reference.

Figure 2:
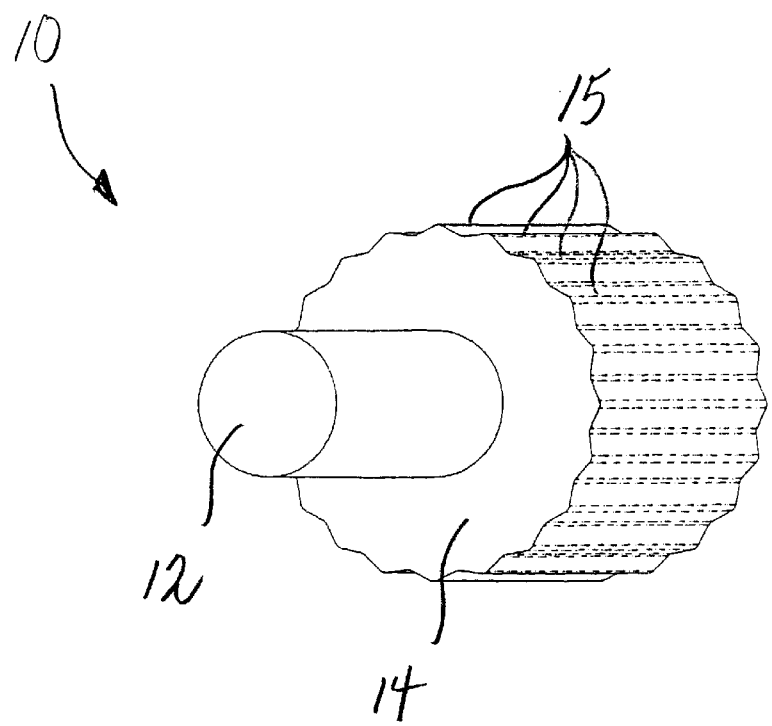
FIG. 2 is an enlarged, fragmentary perspective view of the fishtape with a portion of the outer sheath removed to show the fiberglass core.
Figure 3:
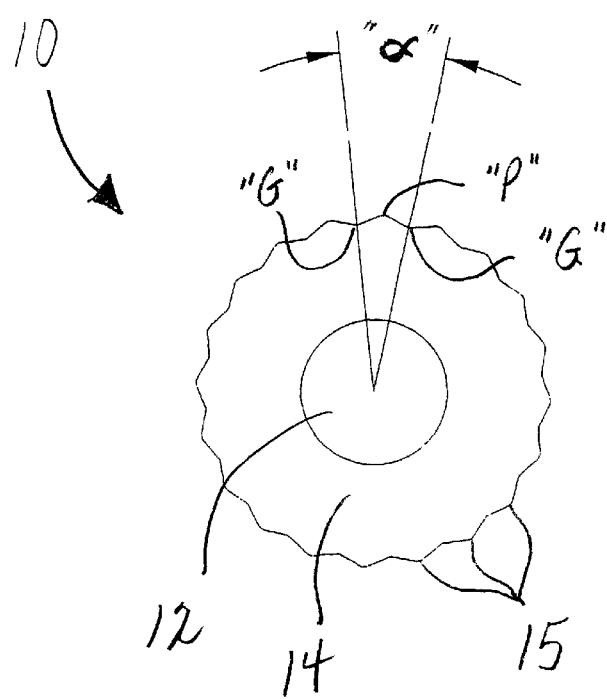
FIG. 3 is an enlarged end view of the fishtape.

Referring to FIGS. 2 and 3, the present fishtape 10 includes a fiberglass core 12 and exterior nylon sheath 14. A number of circumferentially-spaced, longitudinal ribs 15 are formed in the sheath 14, and serve to promote fishability of the fishtape 10 through narrow passageways in buildings and other structures. The longitudinal ribs 15 enhance the column strength and overall stiffness of the fishtape 10. As best shown in FIG. 3, each rib 15 is defined by a point "P" with grooves "G" formed on opposite sides of the point. The ribs 15 create a reduced area of contact between the fishtape 10 and structure of the passageway, thereby reducing the effect of friction and requiring less tensile force to pull the fishtape 10 back through the passageway. In addition, the grooves "G" provide spaces for lubricants which may be applied to the fishtape 10 to further reduce friction.

In the example illustrated, the outer diameter of the fishtape 10 measured from point to point is 0.195 inches. The diameter of the fishtape 10 measured from groove to groove is 0.185 inches. The diameter of the fiberglass core 12 is 0.080 inches. The fishtape 10 includes 20 rib points "P" with each point being defined by an angular distance "α" of 18 degrees, as measured from a bottom of the grooves "G". The radius of each rib point "P" and groove "G" is 0.005 inches.

Figure 4:
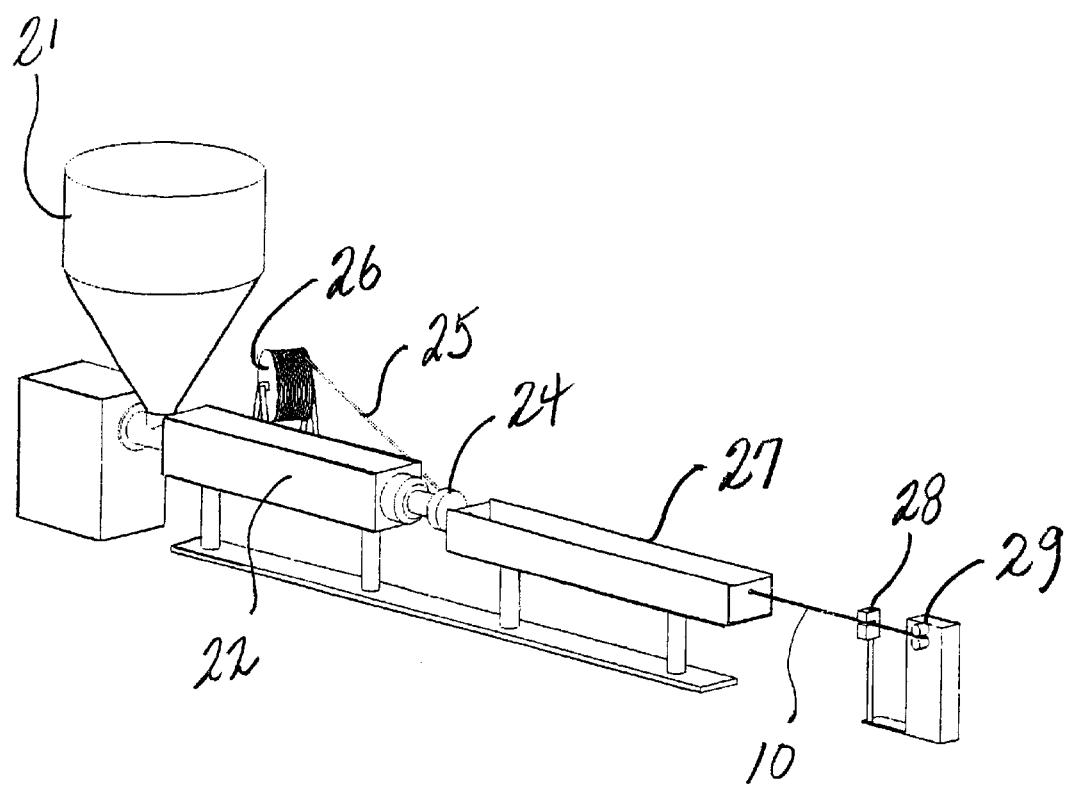
FIG. 4 is a perspective view of the assembly used in the process of forming the fishtape.

A process for forming the fishtape is illustrated generally in FIG. 4. Nylon pellets are fed into a hopper 21, heated, and moved downstream through the extruder 22 to a forming die 24. A spooled length of fiberglass rod 25 forming the core 12 of the fishtape 10 passes from spool 26 through the forming die 24 together with the heated nylon forming the outer sheath 14 of the fishtape 10. The die 24 has a toothed cross-section which forms longitudinal ribs 15 in the nylon sheath 14 as the fishtape 10 exits the extruder 22. Preferably, the nylon is heated in the extruder 22 to a temperature of approximately 550 degrees F. When applied to the fiberglass rod 25 at the forming die 24, the heated nylon causes the outer coating of the fiberglass rod 25 to melt away, thus creating an increased bond between the nylon sheath 14 and fiberglass core 12. The increased bond reduces the potential for movement of the fiberglass core 12 within the outer sheath 14. As a result, the fishtape 10 is capable of achieving a smaller bend radius without failure. Moreover, the synergistic combination of nylon and fiberglass during extrusion creates a fishtape 10 with a higher flex strength and abrasion resistance.

From the forming die 24, the fishtape 10 passes through a quench trough 27 containing water cooled to a temperature of 42–45 degrees F. The length of the trough 27 is approximately 20–25 feet. From the quench trough 27, the fishtape 10 passes through a laser mike gauger 28 which gauges the diameter of the fishtape 10 prior to collection by a take-up winder (not shown). A pull roll unit 29 downstream of the gauger 28 maintains a processing speed of approximately 25 feet per minute.

A fishtape is described above. Various details of the invention may be changed without departing from its scope. Furthermore, the foregoing description of the preferred embodiment of the invention and the best mode of practicing the invention are provided for the purpose of illustration only and not for the purpose of limitation—the invention being defined by the claims.

I claim:

1. A fishtape adapted for being fed through an internal passageway of a structure, said fishtape comprising:
   (a) an elongated, flexible rod comprising a fiberglass core and an exterior sheath applied to said core; and
   (b) a plurality of circumferentially-spaced, longitudinal ribs formed with said flexible rod wherein each of said longitudinal ribs in cross-section comprises a point and first and second grooves formed on opposite sides of said point, said ribs adapted for promoting the fishability of said fishtape through the internal passageway of the structure.

2. A fishtape according to claim 1, wherein the diameter of said fiberglass core is less than one-half the diameter of said flexible rod.

3. A fishtape according to claim 1, wherein said exterior sheath comprises nylon.

4. A fishtape according to claim 1, wherein the distance between a top of the point and a bottom of either groove is approximately 0.01 inches.

5. A fishtape according to claim 1, wherein a top of the point and a bottom of each groove define substantially equal radii.

6. A fishtape according to claim 1, wherein a top of the point of each rib defines a radius of approximately 0.005 inches.

7. A fishtape according to claim 1, wherein a bottom of each groove defines a radius of approximately 0.005 inches.

8. A fishtape according to claim 1, wherein the angular distance between grooves of each rib measured from a center of said fiberglass rod is between 15 and 20 degrees.

9. A fishtape adapted for being fed through an internal passageway of a structure, said fishtape comprising:
   (a) an elongated, flexible rod comprising a fiberglass core and an exterior sheath applied to said core; and
   (b) a plurality of circumferentially-spaced, longitudinal ribs formed with said flexible rod and adapted for promoting the fishability of said fishtape through the internal passageway of the structure, said ribs being spaced apart around the entire circumference of said exterior sheath.

10. A fishtape according to claim 9, wherein the diameter of said fiberglass core is less than one-half the diameter of said flexible rod.

11. A fishtape according to claim 9, wherein said exterior sheath comprises nylon.

12. A fishtape according to claim 9, wherein each of said longitudinal ribs in cross-section comprises a point and first and second grooves formed on opposite sides of said point.

13. A fishtape according to claim 12, wherein the distance between a top of the point and a bottom of either groove is approximately 0.01 inches.

14. A fishtape according to claim 12, wherein a top of the point and a bottom of each groove define substantially equal radii.

15. A fishtape according to claim 12, wherein a top of the point of each rib defines a radius of approximately 0.005 inches.

16. A fishtape according to claim 12, wherein a bottom of each groove defines a radius of approximately 0.005 inches.

17. A fishtape according to claim 12, wherein the angular distance between grooves of each rib measured from a center of said fiberglass rod is between 15 and 20 degrees.

* * * * *